(12) United States Patent
Koley (10) Patent No.: US 7,330,666 B1
(45) Date of Patent: Feb. 12, 2008

(54) METHOD AND APPARATUS FOR CONTROLLING MODULATOR PHASE ALIGNMENT IN A TRANSMITTER OF AN OPTICAL COMMUNICATIONS SYSTEM

(75) Inventor: Bikash Koley, Greenbelt, MD (US)

(73) Assignee: Ciena Corporation, Linthicum, MD (US)

( * ) Notice: Subject to any disclaimer, the term of this patent is extended or adjusted under 35 U.S.C. 154(b) by 647 days.

(21) Appl. No.: 10/355,585

(22) Filed: Jan. 31, 2003

(51) Int. Cl.
*H04B 10/04* (2006.01)
(52) U.S. Cl. .................... 398/188; 398/197; 398/198
(58) Field of Classification Search ........ 398/197–198, 398/188
See application file for complete search history.

(56) References Cited

U.S. PATENT DOCUMENTS

| | | | | |
|---|---|---|---|---|
| 6,687,466 | B1* | 2/2004 | Chiappetta | 398/193 |
| 6,693,929 | B1* | 2/2004 | Essiambre et al. | 372/26 |
| 6,816,299 | B1* | 11/2004 | Glingener et al. | 359/276 |
| 2002/0001115 | A1* | 1/2002 | Ishida et al. | 359/180 |
| 2002/0047750 | A1 | 4/2002 | Geiger et al. | 332/106 |
| 2003/0030874 | A1* | 2/2003 | Glingener et al. | 359/181 |
| 2003/0147114 | A1* | 8/2003 | Kang et al. | 359/245 |

OTHER PUBLICATIONS

"Duobinary carrier-suppressed return-to-zero format and its application to 100Ghz-spaced 8x 43-Gbit/s DWDM unrepeatered transmission over 163 km", Yutaka Miyamoto, Kazushige Yonenaga, Akira Hirano, Hiromu Toba, Optical Society of America, 2000.*
"Performance Evaluation of Prechirped RZ and CS-RZ Formats in High-Speed Transmission Systems with Dispersion Management", Akihide Sano and Yutaka Miyamoto, Journal of lightwave technology, vol. 19, No. 12, Dec. 2001.*
"320 Gbit/s (8x40 Gbit/s WDM transmission over 367-km zero dispersion-flattened-line with 120-km repeater spacing using carrier-suppressed return-to-zero pulse format", OAA 1999, pp. 4-1 to 4-4.*
Jeffrey H. Sinsky, "A Microwave Spectral Approach for Aligning High Speed Data and Soliton Pulse Trains in Dual Mach-Zehnder Modulator Optical Transmitters," Optical Fiber Conference (OFC) 2001, pp. 743-744.
R. A. Griffin, et al., "40 Gb/s RZ GaAs Transmitter With Integrated Waveform Monitoring," The European Conference on Optical Communication (ECOC), 2002.
Inuk Kang, et al., "A Novel Method for Synchronizing the Pulse Carver and Electroabsorption Data Modulator in RZ Optical Transmitters," Bell Labs, Lucent Technologies, in OFC 2001, pp. 588-589.

* cited by examiner

*Primary Examiner*—Jason Chan
*Assistant Examiner*—Wai Lun Leung
(74) *Attorney, Agent, or Firm*—Clements Walker; Christopher L. Bernard; Tyler S. Brown

(57) ABSTRACT

A method of controlling phase alignment in a modulator of a transmitter in an optical communications system uses a narrowband optical filter to monitor changes in power spectral density of a modulated output at and around the optical carrier frequency. In one embodiment, a method controls alignment of a carrier-suppressed-return-to-zero (CSRZ) pulse train in accordance with changes in the power spectral density of the CSRZ modulated optical signal at and around the optical carrier frequency and generates phase adjustment control signals by executing a phase-control loop to maintain the power spectral density of the CSRZ modulated output at the optical carrier frequency at a desired level.

20 Claims, 10 Drawing Sheets

FIG. 1

Prior Art

FIG. 9

METHOD AND APPARATUS FOR CONTROLLING MODULATOR PHASE ALIGNMENT IN A TRANSMITTER OF AN OPTICAL COMMUNICATIONS SYSTEM

FIELD OF THE INVENTION

The present invention relates to a method and apparatus for controlling modulator phase alignment in a transmitter of an optical communications system.

DESCRIPTION OF RELATED ART

A transmitter in an optical communications system transmits a data stream by modulating the intensity of light (an optical carrier signal) guided via optical fiber. In existing optical communications systems, a non-return-to-zero (NRZ) modulation scheme, in which a sequence of 1 s is transmitted without switching the intensity of the optical carrier signal to zero between each data bit, is commonly used. NRZ modulation utilizes less frequency spectrum as compared to a return-to-zero (RZ) modulation scheme, in which the intensity of the optical carrier signal always returns to zero in between bits of the data stream. Narrower frequency spectrum for modulated data is beneficial for wavelength division multiplexing (WDM) as it reduces crosstalk between the neighboring WDM channels and may also lead to a greater number of channels with narrower channels spacing (e.g., 25 GHz instead of 50 GHz or 100 GHz) within the same frequency band. For this reason, NRZ modulation is particularly suitable for WDM optical communications networks in which a plurality of narrowly spaced channels, e.g., 25 GHz channel spacing, are multiplexed on the same optical fiber.

For transmission over long distances, however, RZ modulation has advantages over NRZ modulation because the reduced power requirements of RZ modulation create fewer non-linear effects, such as self phase modulation (SPM), four wave mixing, cross phase modulation, etc. Thus, for high power transmission over long distances, non-linear effects are constraining factors that may prevent the use of NRZ modulation.

For high data rates, e.g., 40 Gbps or higher, standard RZ modulation requires relatively wide channel spacing. For example, 160 GHz channel spacing may be required to transmit at 40 Gbps using standard RZ modulation. Therefore, to accommodate narrower channel spacing, such as 100 GHz channel spacing for 40 Gbps data rates, variants of RZ modulation have been considered. One such Rz variant being considered is carrier-suppressed-return-to-zero (CSRZ) modulation. In the CSRZ format, in order to obtain a narrower modulated spectrum, phase of the neighboring pulses differ by π. This also leads to suppressed interaction between the neighboring pulses. As a result, the CSRZ format has a larger tolerance to the degradation of signal quality due to SPM and group velocity dispersion (GVD) compared to conventional RZ and NRZ.

Figure 1:
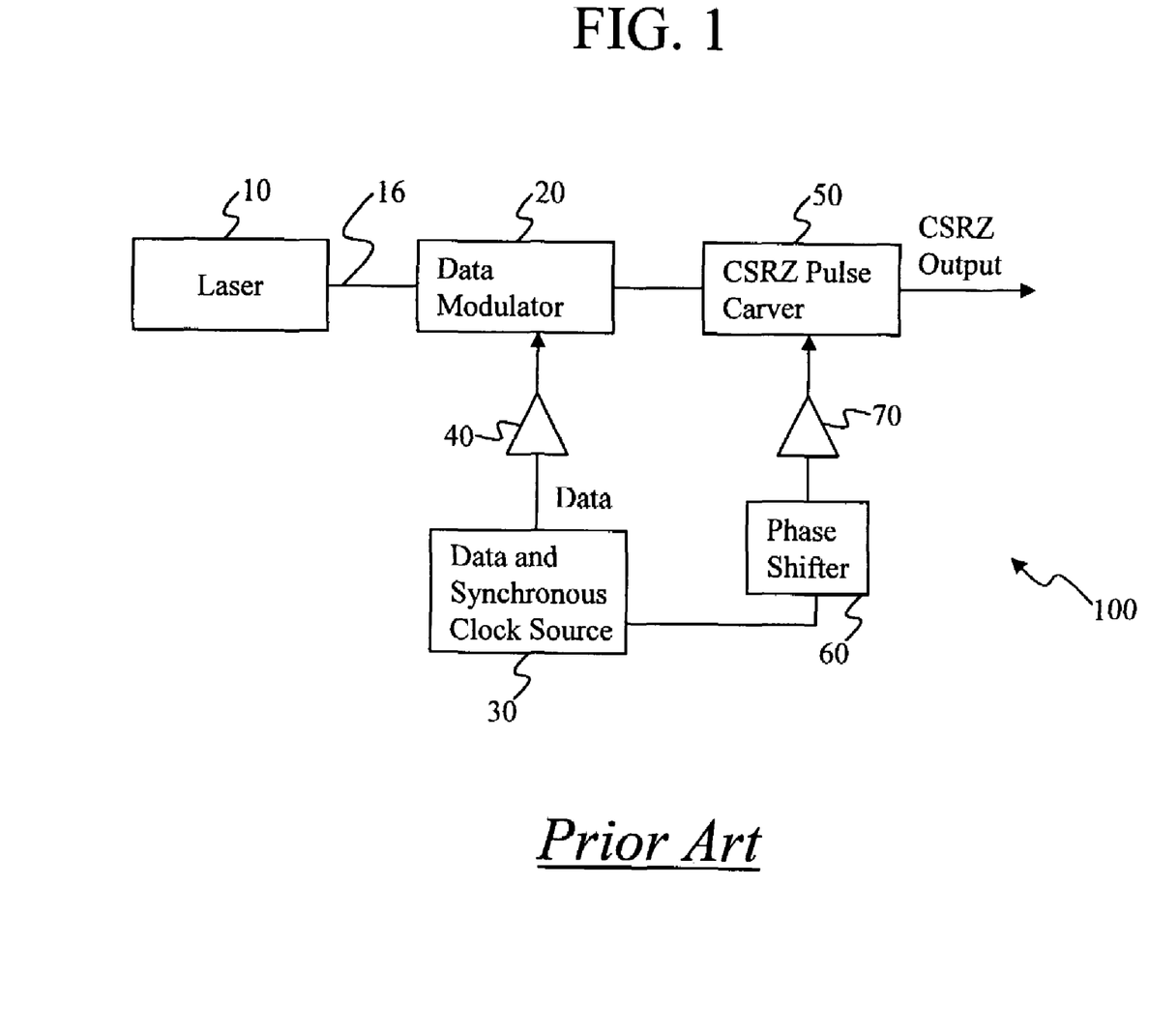
FIG. 1 is a block diagram of a conventional CSRZ-based transmitter in an optical communications system.

FIG. 1 generally illustrates a typical transmitter configuration for implementing CSRZ modulation in an optical communications system. As seen in FIG. 1, the transmitter 100 utilizes two cascaded optical modulators 20, 50. The first modulator 20 is a data modulator, which is driven by a first driver 40 to modulate light received from a laser 10 via optical fiber 16. The first driver 40 drives the data modulator 20 in accordance with the data stream being transmitted at a data rate dictated by a data and synchronous clock source 30.

Conventionally, the data stream being transmitted is a stream of digital 1 s and 0 s (i.e., binary data). The data modulator 20 amplitude modulates the incoming light to generate a data modulated optical signal, which is supplied to the second modulator 50. In the CSRZ-based transmitter configuration of FIG. 1, the second modulator is a "CSRZ pulse carver," which is driven by a second driver 70 to modulate the data modulated optical signal supplied by the data modulator 20 so that it takes on the characteristic of carrier-suppressed (i.e., the DC component of the modulated optical signal is suppressed) pulse train. The second driver 70 drives the CSRZ pulse caver 50 at a clock rate that is half the data rate. In some implementations, CSRZ pulse carving may be performed prior to data modulation (i.e., the CSRZ pulse carver 50 precedes the data modulator 20).

Figure 2A:
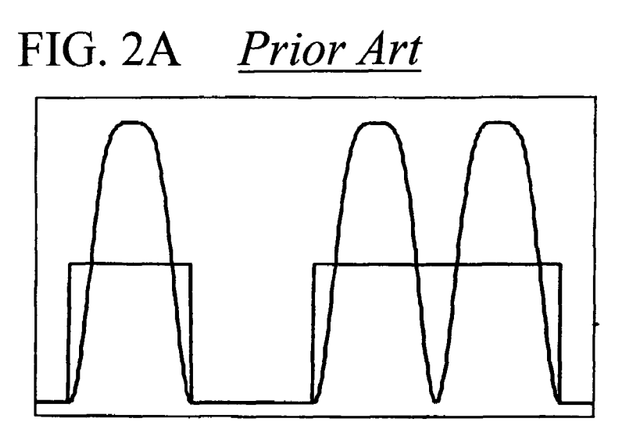
FIG. 2A illustrates proper phase alignment of a CSRZ pulse train with respect to a data stream being transmitted.
Figure 2B:
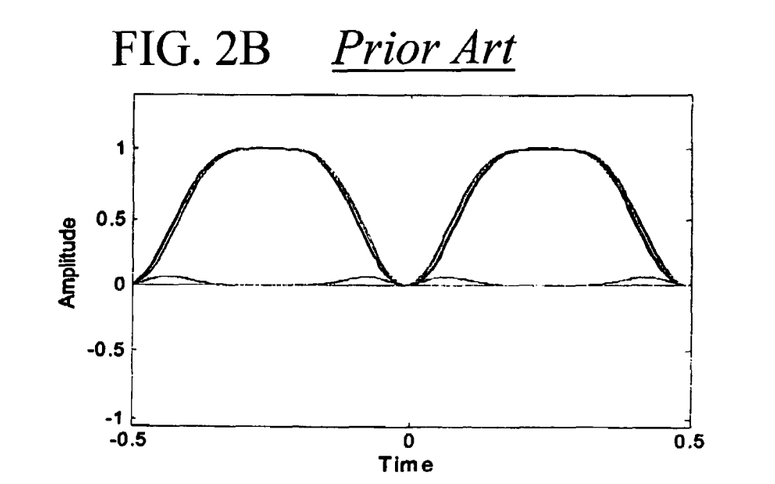
FIG. 2B is an eye diagram showing modulated signal quality for the phase alignment of FIG. 2A.

For the CSRZ-based transmitter 100 of FIG. 1 to operate properly, the output of the CSRZ pulse carver 50 must be phase shifted by half of a bit slot (e.g., 12.5 ps for 40 Gbps data) with respect to the data modulated signal output by the data modulator 20. A phase shifter 60 connected between the data and synchronous clock source 30 and the second driver 70 phase-shifts the clock signal used to drive the CSRZ pulse carver 50. Over the course of operation, however, components of the transmitter 100 may cause phase drift, resulting in distortion of the CSRZ output. FIG. 2A illustrates proper phase alignment between the CSRZ pulse train and the data stream (represented as a NRZ square waveform in FIG. 2A). In FIG. 2A, the CSRZ output is centered at half the bit-period of the NRZ waveform representing the data stream being transmitted. FIG. 2B illustrates a corresponding "eye diagram" for the CSRZ output of FIG. 2A, which shows little or no deterioration in the CSRZ-modulated optical carrier signal.

Figure 3A:
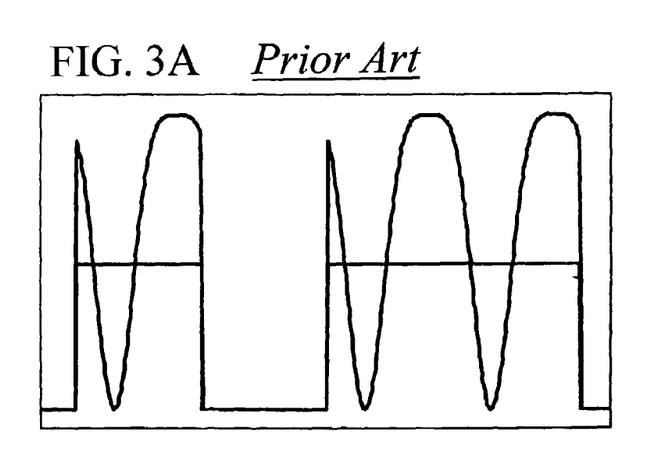
FIG. 3A illustrates phase misalignment of a CSRZ pulse train with respect to the data stream being transmitted.
Figure 3B:
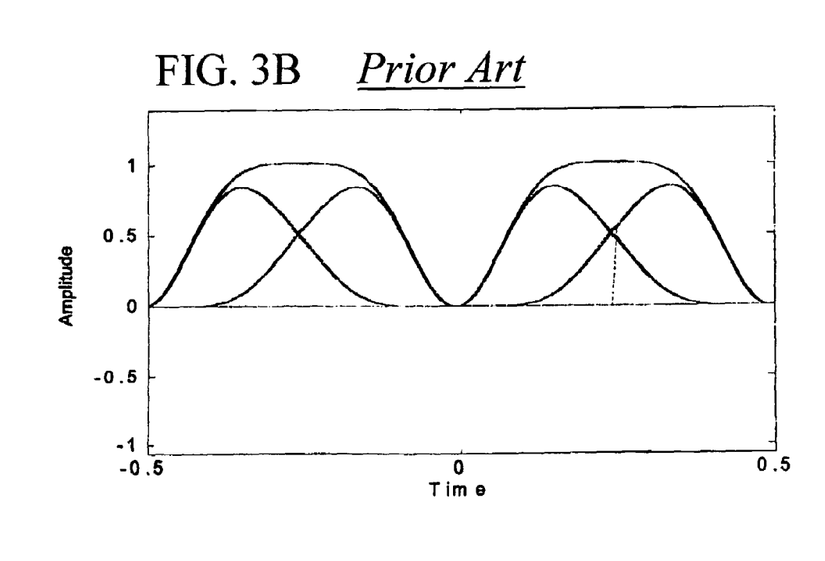
FIG. 3B is an eye diagram showing deterioration in the modulated signal quality caused by the phase misalignment of FIG. 3A.

FIG. 3A illustrates the situation of phase misalignment between the CSRZ pulse train with respect to the data stream, which may be caused by such factors as component aging and temperature changes. As seen in FIG. 3A, the CSRZ pulses are off-center in relation to the bit-period of the NRZ waveform representing the data stream being transmitted. FIG. 3B illustrates the resulting deterioration in the eye diagram. Although CSRZ pulse carver phase can be adjusted manually in the laboratory to visually align the CSRZ pulse train with the data stream by observing the eye diagram of the CSRZ-modulated optical signal on an oscilloscope, such manual phase adjustment cannot be implemented once the CSRZ-based transmitter is deployed in the field. Furthermore, possible techniques proposed thus far to achieve phase alignment in a CSRZ-based transmitter of an optical communications system would add substantial complexity/cost to the transmitter.

For example, one proposed solution for performing automated phase control in a CSRZ-based transmitter, discussed in J. H. Sinsky, paper ThGG93, Optical Fiber Conference (OFC) 2001 (page 743), requires an onboard RF spectrum analyzer to recognize changes in the shape of the RF spectrum of a CSRZ modulated signal by optical-to-electrical conversion of the CSRZ modulated light wave using a very wideband photo-diode. More specifically, the photo-diode bandwidth in such a system would be comparable to the data rate. For example, for a 40 Gbps application, this would be 40 GHz or more. Such a technique, however, substantially increases the expense of the CSRZ transmitter due to the necessity of the very wide band photo-diode, having a bandwidth at least equal to or higher than the data rate, and the complexity and processing power required to analyze the RF spectrum of the CSRZ modulated light wave.

BRIEF DESCRIPTION OF THE DRAWINGS

Embodiments of the invention will become understood from the detailed description given hereinbelow and the accompanying drawings, which are given by way of illustration only and, thus, are not limitative of the present invention, and wherein.

DETAILED DESCRIPTION OF THE INVENTION

The present invention is a method and an apparatus for controlling modulator phase alignment in a transmitter of an optical communications system. The following detailed description of the invention refers to the accompanying drawings. The same reference numbers in different drawings identify the same or similar elements. The following detailed description does not limit the invention. Instead, the scope of the invention is defined by the pending claims and equivalents thereof.

Although the following detailed description uses expressions such as "connected" and "coupled" such terms are used as relative terms and do not require a direct physical connection. For example, the expression "optically coupled" as used herein refers to any connection, coupling, link, or the like by which optical signals are imparted from one optical system element to another. Such "optically coupled" elements are not necessarily directly connected to one another and may be separated by intermediate components or devices. Likewise, expressions such as "operatively connected" as used herein are relative terms and do not require a direct physical connection. Likewise, expressions describing signals being "supplied" from one element to another, or similar expressions, do not require direct connection, in that signals may be indirectly supplied from one element to another via intermediate elements.

Figure 4:
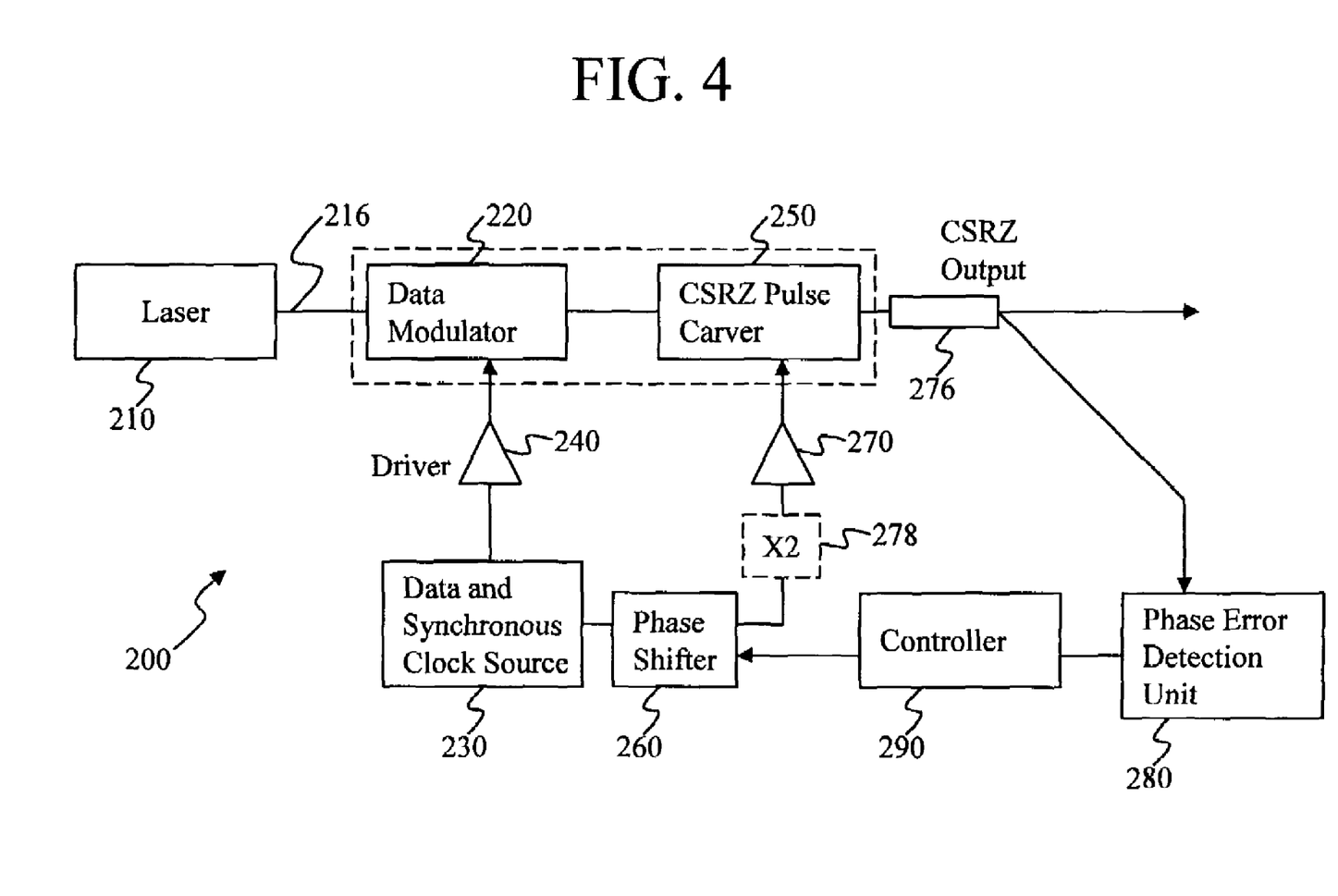
FIG. 4 is a block diagram of a CSRZ-based transmitter, which performs active phase alignment in accordance with principles of the present invention.

Referring now to the drawings, FIG. 4 illustrates a transmitter configuration for implementing CSRZ modulation in an optical communications system according to an exemplary embodiment of the present invention. The CSRZ-based optical transmitter 200 according to this embodiment includes the following main elements: a laser 210; a data modulator 220; a data and synchronous clock source 230; a first modulator driver 240; a CSRZ pulse carver 250; a phase shifter 260; a second modulator driver 270; a phase error detection unit 280; and a controller 290. The transmitter 200 further includes an optical coupler 276, connected to the output of the CSRZ pulse carver 250. The transmitter 200 may further include a clock multiplier 278, for varying the clock frequency supplied by the data and synchronous clock source 230.

The laser 210 may be any suitable light source and preferably has a narrow line width to avoid interfering with other channels. Suitable examples of laser 210 include a Distributed Feedback (DFB) laser or a Distributed Bragg Reflector (DBR) laser. In some implementations, the laser 210 may be tunable to generate an optical carrier signal at a controllable wavelength. As discussed above with reference to FIG. 1, a CSRZ-based transmitter utilizes two cascaded modulators to generate a CSRZ output. Both modulators, i.e., the data modulator 220 and the CSRZ pulse carver 250, which together form a transmitter modulator configuration, may each be a conventional modulator such as a Lithium-Niobate Mach-Zehnder modulator or other conventional modulator. In the embodiment illustrated in FIG. 4, the data modulator 220 is driven by the first modulator driver 240 to modulate light supplied by the laser 210 via optical fiber 216. The first modulator driver 240 drives the data modulator 220 in accordance with the data stream to be transmitted at a data rate dictated by the data and synchronous clock source 230 to generate and output a data modulated optical signal. The data stream supplied to the first modulator driver 240 by the data and synchronous clock source 230 may be a stream of digital 1 s and 0 s (e.g., binary data represented by a NRZ square waveform).

The CSRZ pulse carver 250 is driven by the second modulator driver 270 to modulate the data modulated optical signal supplied by the data modulator 220 so that it takes on the characteristic of a carrier-suppressed pulse train. The CSRZ pulse carver 250 is driven by a second modulator driver 270 at a clock speed that is half the data rate. To supply a suitable clock signal for driving the CSRZ pulse carver 250, the data and synchronous clock source 230 may supply the second modular driver 270 with a clock signal that is half the data rate. As an alternative, which is shown in the embodiment of FIG. 4, the data and synchronous clock source 230 may supply a clock signal that is ¼ the data rate, which the clock multiplier 278 doubles to supply the second modulator driver 270 with a suitable clock signal. The clock multiplier 278 is a conventional element, which may be provided between the data and synchronous clock source 230 and the second modulator driver 270 to generate a suitable clock signal, depending on the clock rate supplied by the data and synchronous clock source 230. Furthermore, as discussed above with reference to the conventional arrangement of FIG. 1, proper operation of the CSRZ-based transmitter 200 requires that the output of the CSRZ pulse carver 250 be phase shifted by half of a bit slot/period (e.g., 12.5 ps for 40 Gbps data) with respect to the data modulated signal output by the data modulator 220. Accordingly, the phase shifter 260 is provided between the data and synchronous clock source 230 and the clock multiplier 278 to phase shift the clock signal provided to the second modulator driver 270 via the clock multiplier 278. The phase shifter 260 is a conventional element, such as a voltage controlled phase shifter. In one exemplary implementation of the present invention, the data and synchronous clock source 230 provides 40 Gbps data and a synchronous 10 GHz clock, such that the first modulator driver 240 drives the data modulator 220 at 40 Gbps and the second modulator driver 270 drives the CSRZ pulse carver 250 at 20 GHz. It should be understood that, although principles of the present invention provide particular advantages in high-speed optical transmission systems (40 Gbps and beyond), the invention is applicable to a wide range of data rates for the transmitter 200. Furthermore, as in the conventional CSRZ-based optical transmitter discussed above with reference to FIG. 1, the data modulator 220 and the CSRZ pulse carver 250 may be reversed in order.

In the embodiment of FIG. 4, the phase shifter 260 adjusts the clock signal output to the second modulator driver 270 via the clock multiplier 278 under control of the controller 290. The controller 290 in this embodiment may be implemented using existing devices such as a microprocessor-based control device, an application specific integrated circuit (ASIC), or an electronic circuit. Although illustrated as a discrete component, the functionality of the controller 290 (described in greater detail below) may be combined with other elements performing aspects of transmitter control. In accordance with principles of the present invention, the controller 290 executes a phase-control loop to adjust phase of the CSRZ pulse carver 250 to maintain proper alignment between the CSRZ output and the data being transmitted (i.e., to avoid deterioration of the CSRZ format modulated optical signal output by the transmitter 200).

The inventor of this application has found that the power spectral density of the CSRZ output of the transmitter 200 at zero (or near zero) frequency offset from the optical carrier frequency can be monitored to accurately recognize phase misalignment between the CSRZ pulse carver 250 and the data being transmitted. More specifically, the controller 290 monitors occurrences of reduced spectral density of the CSRZ output at and around the optical carrier frequency, which the inventor has found signifies phase misalignment between the CSRZ pulse carver 250 and the data being transmitted, for automatic phase alignment. Based on fluctuations in the power spectral density of the CSRZ output at and around the optical carrier frequency, the controller 290 adjusts phase of the CSRZ pulse carver 250 via the phase shifter 250 to automatically maintain proper alignment, thereby maintaining proper operation of the transmitter 200 over time. Importantly, this phase alignment technique does not require complex spectral analysis equipment or very wideband (high speed) optical-to-electrical conversion components. Instead, only a narrow slice of the optical spectrum at approximately zero offset from the optical carrier frequency needs to be monitored. In accordance with the embodiment illustrated in FIG. 4, the phase error detection unit 280 supplies controller 290 with a phase error detection (or tracking) signal, which varies as a function of power spectral density of the CSRZ format modulated signal output at and around the optical carrier frequency. In one implementation of the present invention, the phase error detection unit 280 provides the controller 290 with a signal that tracks changes in power spectral density of the CSRZ output at the optical carrier frequency and the controller 290 controls the phase shifter 260 so as to maximize such power spectral density at the optical carrier frequency.

Figure 5:
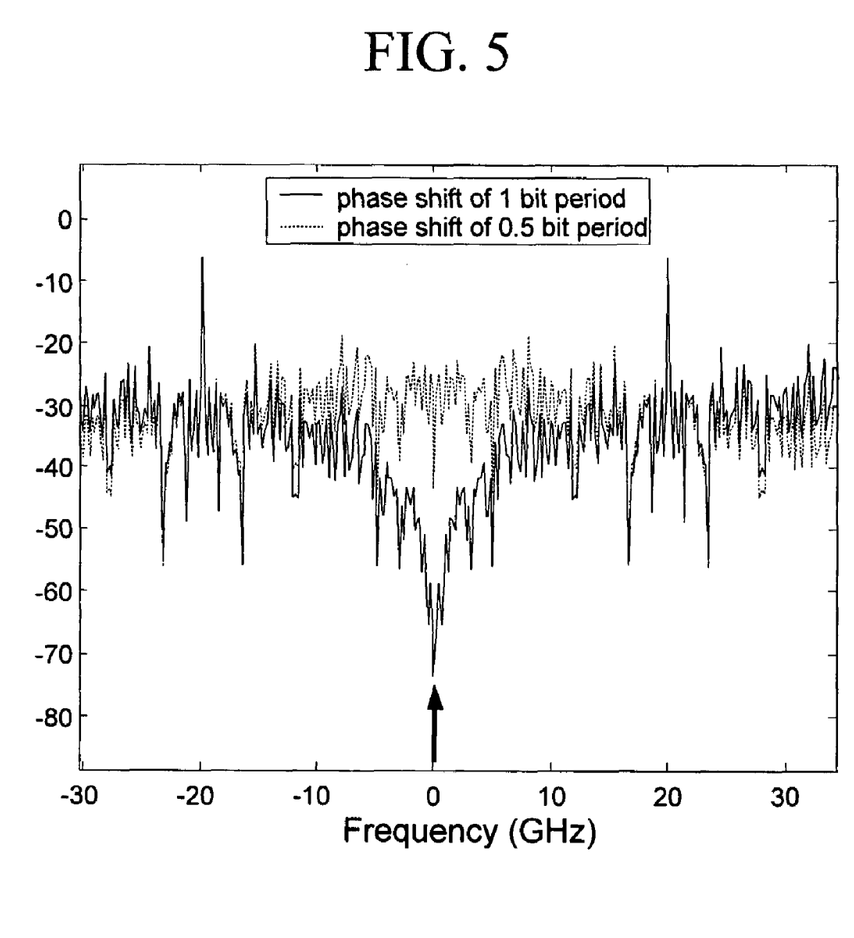
FIG. 5 is a power spectral density graph illustrating power spectral density of a CSRZ-based transmitter output over a range of frequencies for both phase alignment and phase misalignment.

FIG. 5 is a power spectral density graph illustrating power spectral density of a CSRZ binary modulated output over a range of frequencies above and below the optical carrier frequency. In FIG. 5, the dashed line illustrates the power spectral density of the CSRZ binary modulated output during proper phase alignment of the CSRZ pulse carver 250 and the solid line illustrates the power spectral density of the CSRZ output during misalignment of the CSRZ pulse driver 250. As seen in FIG. 5, the power spectral density at and around the optical carrier frequency (illustrated in the dB scale) decreases significantly when there is CSRZ pulse carver misalignment.

Figure 6A:
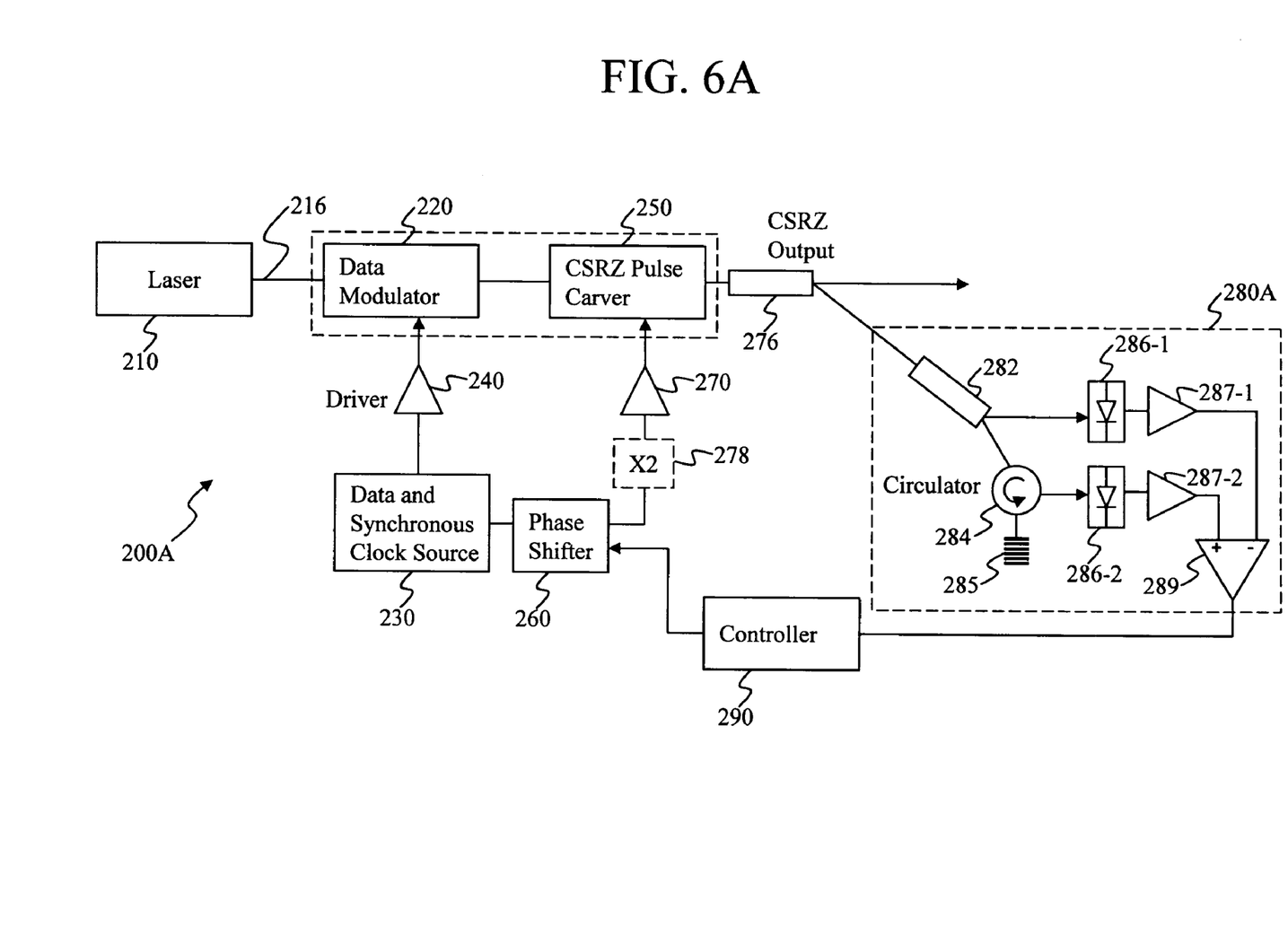
FIG. 6A is a block diagram illustrating, in more detail, a CSRZ-based transmitter in accordance with one exemplary implementation of the present invention.

FIG. 6A illustrates a CSRZ transmitter configuration 200A in accordance with one exemplary implementation of the present invention. In FIG. 6A, a phase error detection unit 280A includes the following elements: an optical coupler 282; an optical circulator 284; a wavelength selection filter 285; a pair of photo-detectors 286-1, 286-2; a pair of amplifiers 287-1, 287-2; and a differential amplifier 289. The optical coupler 276, which can constitute a conventional optical tap or splitter, is optically coupled to the output of the CSRZ pulse carver 250 and an input of the phase error detection unit 280A to supply a portion of the CSRZ output to the phase error detection unit 280A. The optical coupler 282 of the phase error detection unit 280A splits the signal received from optical coupler 276 into two separate paths. The optical signal provided on the first path, e.g., at approximately equal power as compared to the optical signal output on the second path, is supplied to a first photo-detector 286-1, such as a photo-diode. The first photo-detector 286-1 performs optical-to-electrical conversion to generate an electrical signal having a voltage level corresponding to the power of light supplied thereto. The output of the first photo-detector 286-1 serves as a reference signal proportional to the average optical power of the CSRZ modulated signal when determining relative changes in the power spectral density at and around the optical carrier frequency. This reference path cancels out any effects of laser/modulator aging, etc., in the phase error detection result. The first photo-detector 286-1 may be a narrowband (low-speed) photo-diode, e.g., 1 MHz bandwidth or less. Thus, the reference path may be extremely low cost as compared to the wideband photo-diode required by the proposed technique for phase alignment discussed in the "Description of Related Art."

The optical signal output by the optical coupler 282 along the second path is supplied to a circulator 284, which may be a conventional 3-port circulator. The circulator 284 outputs the received optical signal to a wavelength selection filter 285, which extracts a narrow slice of wavelengths at and around the optical carrier frequency from the optical signal supplied thereto. The wavelength selection filter 285 may be a conventional element, such as an thin film grating, a Fabry-Perot Filter (Etalon), or other suitable optical filter. The wavelength selection filter 285 may be tunable, particularly in implementations where the laser 210 is tunable.

Although the exemplary implementation of FIG. 6A includes circulator 284, the circulator 284 may be excluded if a transmissive-type filter is used as the wavelength selection filter 285. Furthermore, the circulator 284 and the wavelength selection filter 285 may be excluded if the optical coupler 282 is implemented as a wavelength selective coupler, which outputs light of wavelengths at and around the optical carrier frequency to the second photo-detector 286-2 and outputs light of other wavelengths to the first photo-detector 286-1.

Importantly, only a narrow bandwidth for the wavelength selection filter 285 is required to track changes in CSRZ phase alignment in accordance with principles of the present invention. A bandwidth equal to or less than approximately 75% of the data rate is suitable, e.g., equal to or less than 30 GHz for 40 Gbps data-rate. A relatively narrower filter will enhance sensitivity to changes in the power spectrum at and around the optical carrier frequency. For example, an approximately 20 GHz bandwidth may be suitable for a 40 Gbps data rate. A bandwidth of approximately 60% of the data-rate may be optimal from a cost-performance point of view, but this may change with data-rate. In the exemplary implementation of FIG. 6A, the output of wavelength selection filter 285 is provided to the second photo-detector 286-2 via the circulator 284. The second photo-detector 286-2, which may be a low-speed photodiode like the first photo-detector 286-1, converts the received optical signal to an electrical signal having a voltage level corresponding to the power of the extracted wavelengths at and around the center carrier frequency within the optical filter bandwidth. The outputs of the first and second photo-detectors 286-1, 286-2 are supplied to the differential amplifier 289 via first and second amplifiers 287-1, 287-2, which may be logarithmic amplifiers.

The differential amplifier 289 generates a phase error detection signal that tracks changes in relative strength of the CSRZ output at the optical carrier frequency. The controller 290 receives the output of the differential amplifier 289, e.g., via an analog/digital converter (not shown), to monitor changes in power spectral density at and around the optical carrier frequency and adjust phase of the CSRZ pulse carver 250 via the phase shifter 260 to maximize power spectral density at and around the optical carrier frequency, and thereby maintain proper alignment of the CSRZ pulse carver 250.

Although the above-described implementation of the phase error detection unit 280 outputs a relative signal indicating fluctuations in power spectral density at and around the optical carrier frequency, the phase error detection unit 280 may generate and output alternative signals indicating phase alignment/misalignment. For example, the phase error detection unit 280 may compare a measure of power spectral density at and around the optical carrier frequency with a threshold to generate and output a signal indicating phase misalignment when the power spectral density of the modulated signal at and around the optical carrier frequency drops below the threshold. An appropriate threshold for such an implementation may be determined through a learning/testing process.

Figure 6B:
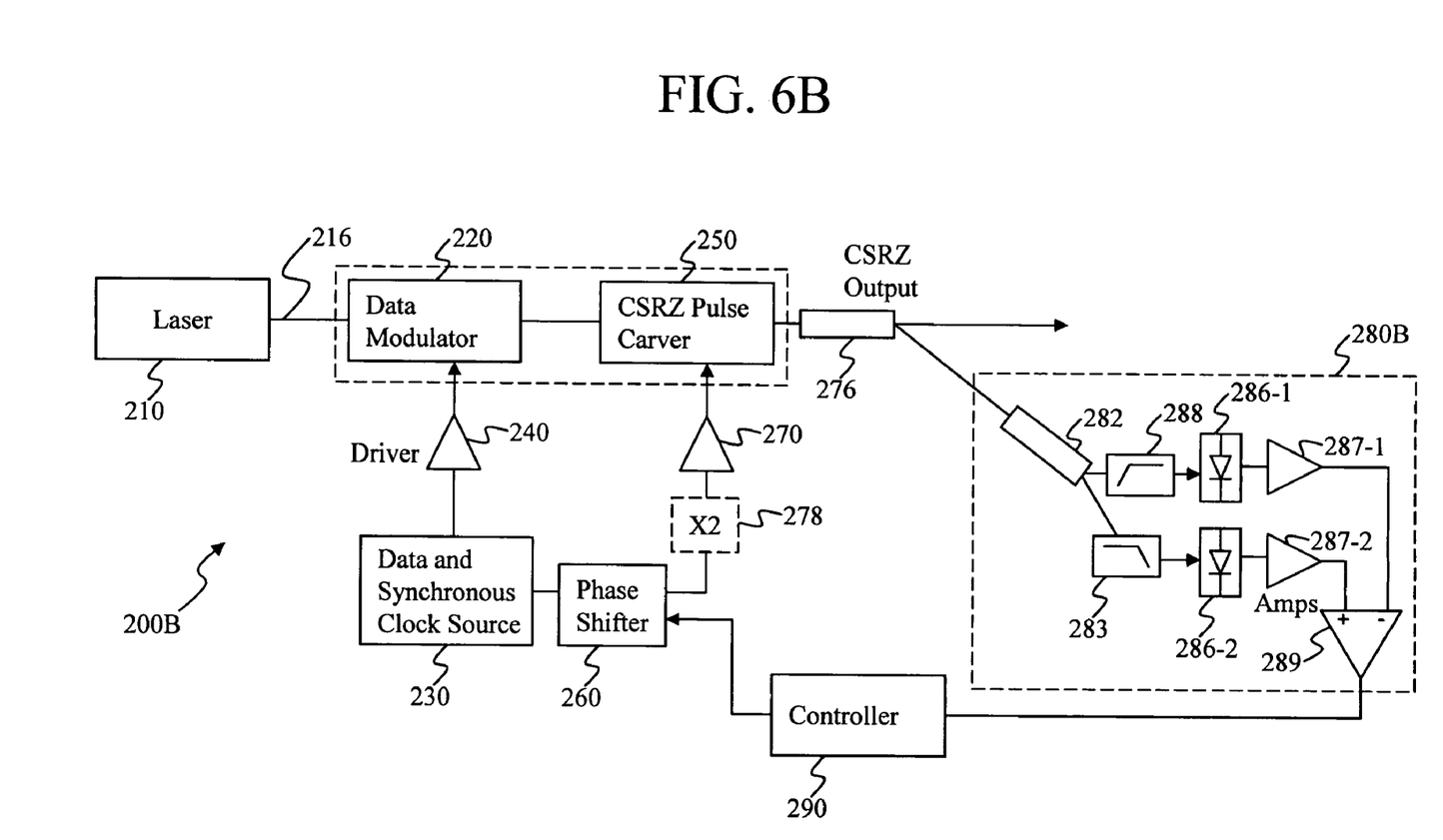
FIG. 6B is a block diagram illustrating an alternative implementation of a CSRZ-based transmitter according to an embodiment of the present invention.

FIG. 6B illustrates an alternative CSRZ transmitter configuration 200B in accordance with an embodiment of the present invention. In the configuration of FIG. 6B, a phase error detection unit 280B includes a high pass filter 288, provided along the first output path of the optical coupler 282 between the optical coupler 282 and the first photo-detector 286-1, and a low pass filter 283, provided along the second output path of the optical coupler 282 between the optical coupler 282 and the second photo-detector 286-2. In accordance with the alternative implementation of FIG. 6B, the power spectral density at the optical carrier frequency is extracted by filtering out frequencies above and below the optical carrier frequency, using the combination of the high pass filter 288 and the low pass filter 283, instead of using a wavelength selection filter 285 such as a grating filter. The output of the high pass filter 288 and the low pass filter 283 are supplied to photo-detectors 286-1, 286-2, respectively. The resulting electrical signals, $OUT_1$ and $OUT_2$, are supplied to the differential amplifier 289 via the first and second amplifiers 287-1, 287-2. In this implementation, the differential amplifier 289 generates a differential signal, $OUT_1$-$OUT_2$, representing the power spectral density at and around the optical carrier frequency. Various other arrangements may be suitable for tracking changes in power spectral density at and around the optical carrier frequency.

Figure 7:
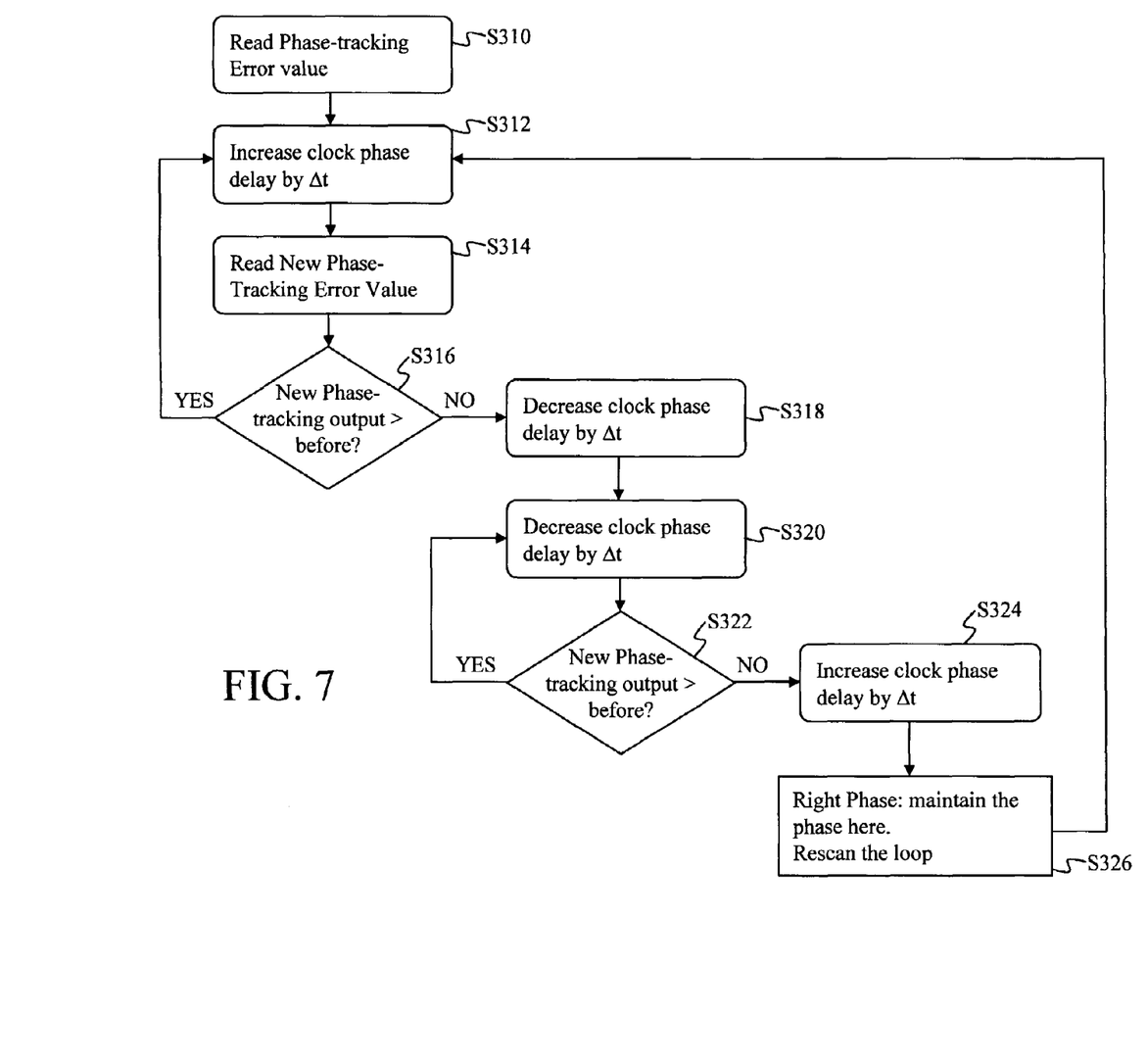
FIG. 7 is a flow diagram illustrating a phase-control loop executed in accordance with an embodiment of the present invention to maintain phase alignment of a CSRZ pulse carver with respect to the data stream being transmitted.

FIG. 7 illustrates a phase-control loop executed by the controller 290 in accordance with an implementation of the present invention. As discussed above, the controller 290 controls phase of the CSRZ pulse carver 250 to maximize power spectral density at the optical carrier frequency. In the phase-control loop illustrated in FIG. 7, the controller 290 incrementally increases/decreases the phase shift imparted by the phase shifter 260 until power spectral density at and around the optical carrier frequency is at a maximum. More specifically, after receiving a phase error detection signal output by the phase error detection unit 280 (S310), the controller 290 outputs a phase adjust command signal to the phase shifter 260 so as to increase clock phase delay by $\Delta t$ (e.g., 0.5 ps or less) (S312). Next, the controller 290 receives a new phase error detection output from the phase error detection unit 280 (S314), representing power spectral density at and around the optical carrier frequency, and determines whether the new phase error detection output is greater than the previous phase error detection output (S316). If yes, the controller 290 again instructs the phase shifter 260 to increase clock phase delay by $\Delta t$ (i.e., returns to S312). If instead the new phase error detection output is not greater than the previous phase error detection output, the controller 290 outputs a command to the phase shifter 260 to decrease clock phase delay by $\Delta t$ (S318). This decrease in clock phase delay by $\Delta t$ is repeated (S320), and the controller 290 determines whether the new phase error detection output is greater than the previous error detection output (S322). If yes, the controller outputs a command to the phase shifter 260 to again decrease clock phase delay by $\Delta t$ (i.e., return to S320). If, however, the new phase-tracking output is not greater than the previous phase-tracking output, the controller 290 commands the phase shifter 260 to increase clock phase delay by $\Delta t$ (S324) and maintains the phase shift at that level (i.e., maintain correct alignment of the CSRZ pulse carver). This phase-control loop may be continuously executed to maintain phase alignment.

In accordance with principles of the present invention, CSRZ phase alignment is achieved without complex processing or expensive spectrum analyzer hardware. Instead, various low-cost, narrow bandwidth optical filters, such as thin-film optical filters, etalon filters, grating filters, or other dispersive elements may be used to track changes in power spectral density at and around the optical carrier frequency. Although embodiments of the present invention have been described above with respect to CSRZ binary modulation, principles the present invention may also be applicable to other forms of CSRZ modulation, such as CSRZ duo-binary modulation.

As is well known, duo-binary modulation relies on three-level coding, whereby the duo-binary modulated optical signal takes on one of three values, to increase spectral efficiency. For CSRZ-based duo-binary modulation, the same general transmitter configuration illustrated in FIG. 4 may be implemented. In this case, the data modulator 220 is a conventional optical duo-binary data modulator driven by the first modulator driver 240 (or a plurality of drivers) at the duo-binary data rate and the CSRZ pulse carver 250 is driven at half the data rate. As in the CSRZ-based binary modulated data embodiment described above, CSRZ pulse carving may be performed prior to data modulation for CSRZ duo-binary modulation.

Figure 8A:
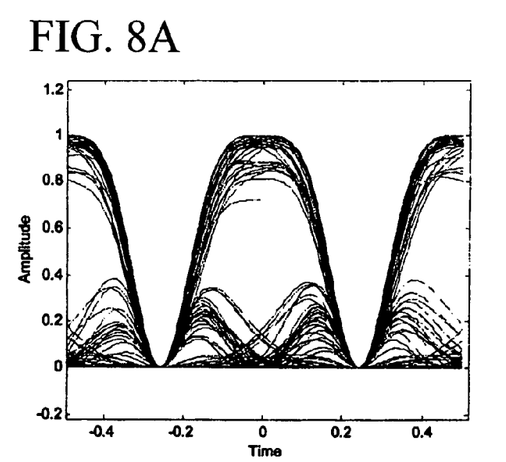
FIG. 8A is an eye diagram showing CSRZ duo-binary modulated signal quality for a proper modulator phase alignment.
Figure 8B:
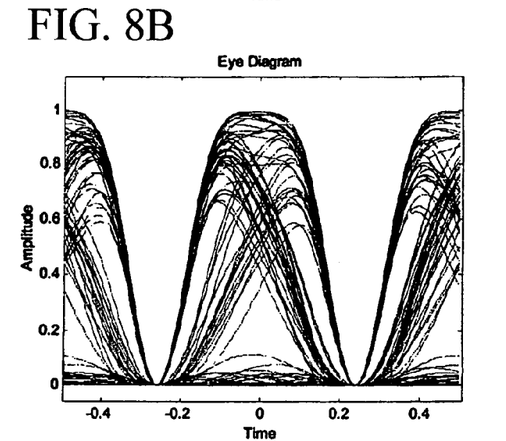
FIG. 8B is an eye diagram showing CSRZ duo-binary modulated signal quality for modulator phase misalignment.

FIG. 8A is an eye diagram where proper modulator phase alignment is achieved for a CSRZ duo-binary pulse train and FIG. 8B is an eye diagram observed for phase misalignment of the CSRZ duo-binary pulse train. The inventor of this application has found that, like the CSRZ binary modulation implementation discussed above, relative changes in the power spectral density of the CSRZ duo-binary output at zero (or near zero) frequency offset from the optical carrier frequency can be monitored to maintain phase alignment between the CSRZ pulse carver and the data. As compared to CSRZ binary modulation, however, power at and around the optical carrier frequency is minimized for proper phase alignment in the CSRZ duo-binary implementation instead of maximized. Therefore, the controller 290 executes a slightly different phase-control loop in a duo-binary CSRZ-based transmitter.

Figure 9:
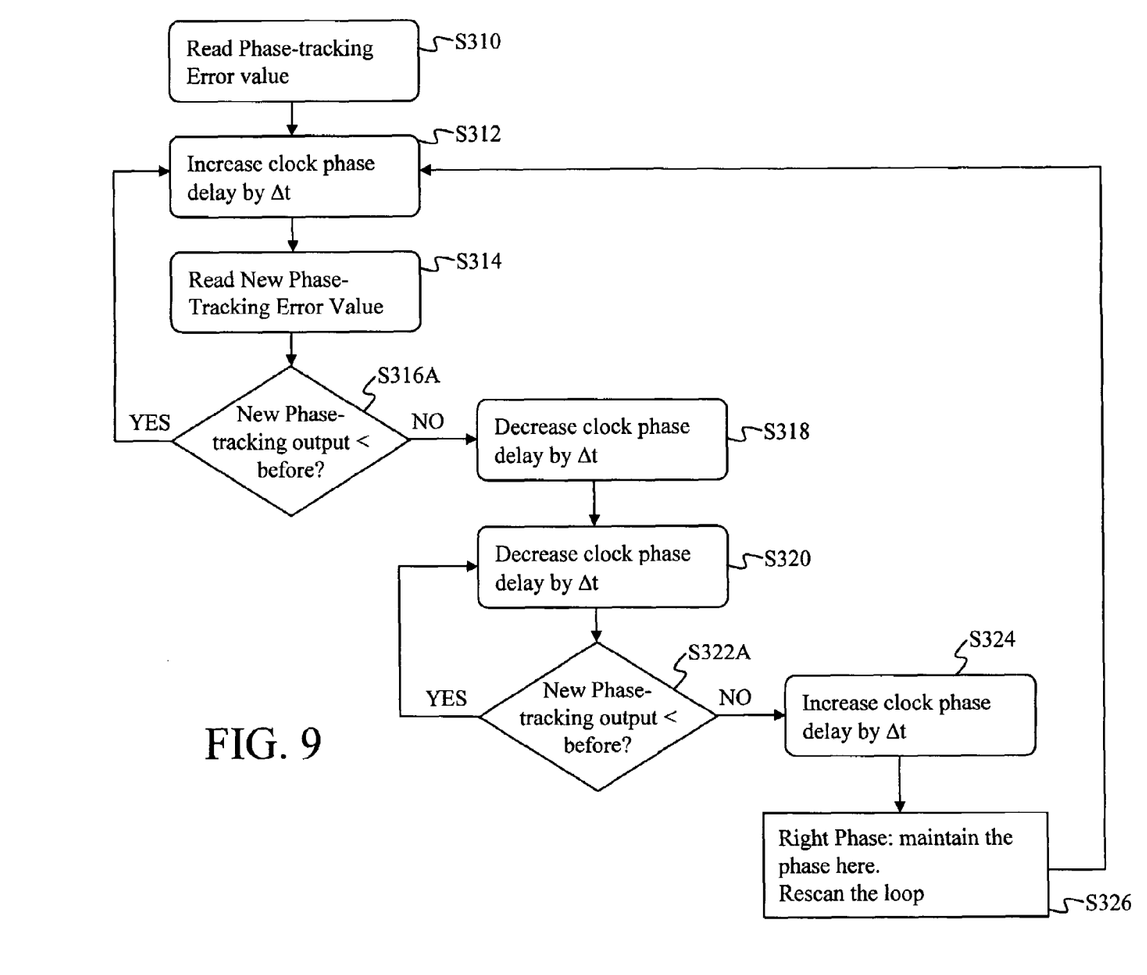
FIG. 9 is a flow diagram illustrating a phase-control loop executed in accordance with an embodiment of the present invention to maintain phase alignment of a modulator in a CSRZ duo-binary transmitter.

FIG. 9 illustrates an exemplary phase-control loop executed by the controller 290 in accordance with an embodiment of the present invention to maintain phase alignment of the CSRZ pulse carver with respect to the data stream being transmitted. It will be recognized that the phase-control loop illustrated in FIG. 9 is the same as that illustrated in FIG. 7, except the controller 290 determines whether the new phase error detection signal generated by the phase error detection unit 280 is less than the previous value at steps S316A and S322A. In other words, the phase-control loop of FIG. 9 for the CSRZ duo-binary implementation attempts to minimize the power spectral density at and around the optical carrier frequency.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

I claim:

1. A method of controlling modulator phase alignment for a transmitter of an optical communication system, said method comprising:
   generating a modulated optical signal with two cascaded modulators included in the transmitter;
   filtering the modulated optical signal generated by the two cascaded modulators in the transmitter to extract a narrowband of wavelengths from the modulated optical signal at and around an optical carrier frequency of the modulated optical signal, said filtering step extracting a band of wavelengths having a bandwidth equal to or less than approximately 75% of a data rate of the transmitter;
   monitoring an output of said filtering step to determine power spectral density at and around an optical carrier frequency of the modulated optical signal, wherein the monitoring step only monitors at and around the optical carrier frequency;
   adjusting phase of one of the cascaded modulators of the transmitter only as a function of the monitored power spectral density tracked over time at and around the carrier frequency of the modulated optical signal; and
   repeating said monitoring and adjusting steps until said modulator phase of said transmitter is in alignment.

2. The method according to claim 1, wherein the transmitter generates the modulated optical signal in accordance with a carrier-suppressed-return-to-zero (CSRZ) modulation format and said step of adjusting adjusts phase of a CSRZ pulse carver.

3. The method according to claim 1, wherein the transmitter generates the modulated optical signal in accordance with a carrier-suppressed-return-to-zero binary modulation format and said step of adjusting adjusts phase of the modulator to increase power spectral density at and around the optical carrier frequency of the modulated optical signal.

4. The method according to claim 3, wherein said step of adjusting adjusts phase of the modulator to maximize power spectral density at and around the optical carrier frequency of the modulated optical signal.

5. The method according to claim 1, wherein the transmitter generates the modulated optical signal in accordance with carrier-suppressed-return-to-zero duo-binary modulation format and said step of adjusting adjusts phase of the modulator to decrease power spectral density at and around the optical carrier frequency of the modulated optical signal.

6. The method according to claim 5, wherein said step of adjusting adjusts phase of the modulator to minimize power spectral density at and around the optical carrier frequency of the modulated optical signal.

7. The method according to claim 1, wherein the bandwidth of extracted wavelengths in said filtering step is approximately 60% of the data rate of the transmitter.

8. The method according to claim 1, wherein said step of monitoring compares an electrical signal representing power spectral density at and around the optical carrier frequency with a reference signal proportional to average optical power of the modulated optical signal.

9. The method according to claim 1, wherein one of the cascaded modulators is a data modulator and the other modulator is a carrier-suppressed-return-to-zero (CSRZ) pulse carver, and said step of adjusting adjusts the phase of the CSRZ pulse carver.

10. The method according to claim 7, wherein said step of monitoring extracts a 30 GHz or less band of wavelengths from the modulated optical signal.

11. The method according to claim 7, wherein said step of monitoring extracts the narrow range of wavelengths from the modulated optical signal using a thin film filter, grating filter or etalon.

12. A transmitter of an optical communications system, said transmitter generating a modulated optical signal in accordance with a data signal provided by a data signal source, said transmitter comprising:
   a light source generating an optical carrier signal;
   a modulator configuration optically connected to said light source, said modulator configuration receiving the optical carrier signal and the data signal and modulating the optical carrier signal in response to the data signal to generate a carrier-suppressed-return-to-zero (CSRZ) format modulated optical signal;
   an optical filter optically connected to said modulator configuration to extract a narrow band of wavelengths from the modulated optical signal at and around an optical carrier frequency of the modulated optical signal, said optical filter having a filtering bandwidth equal to or less than approximately 75% of a data rate of the transmitter;
   a controller operatively connected to said modulator configuration to adjust phase of the CSRZ format modulated optical signal, said controller generating phase adjustment control signals only as a function of power spectral density tracked over time of an output of said optical filter at and around the optical carrier frequency of the CSRZ format modulated optical signal until said modulator is in phase alignment; and wherein said modulator configuration comprises multiple cascaded modulators, including a data modulator modulating the optical carrier signal in response to the data signal and a CSRZ pulse carver modulating the optical carrier signal to generate a CSRZ pulse train.

13. The transmitter as set forth in claim 12, further comprising:

an optical-to-electrical conversion element optically connected to said optical filter, said optical-to-electrical conversion element generating a measure of power spectral density at and around the optical carrier frequency of the CSRZ format modulated optical signal, an output of said optical-to-electrical conversion element tracking changes in power spectral density at and around the optical carrier frequency of the CSRZ format modulated optical signal, wherein said controller is operatively connected to said optical-to-electrical conversion element to generate phase adjustment control signals as a function of the measure of power spectral density at and around the optical carrier frequency of the CSRZ format modulated optical signal.

14. The transmitter as set forth in claim 12, wherein said modulator further comprises:

a phase shifter adjusting phase of at least one of said cascaded modulators in accordance with phase adjustment control signals output by said controller.

15. The transmitter as set forth in claim 12, wherein said CSRZ pulse carver modulates a data modulated output of said data modulator to generate the CSRZ format modulated optical signal of the transmitter.

16. The transmitter as set forth in claim 12, wherein said modulator configuration performs CSRZ format binary modulation.

17. The transmitter as set forth in claim 16, wherein said controller adjusts phase of said modulator configuration to maximize power spectral density at and around the optical carrier frequency of the CSRZ format modulated optical signal.

18. The transmitter as set forth in claim 12, wherein said modulator configuration performs CSRZ format duo-binary modulation.

19. The transmitter as set forth in claim 18, wherein said controller adjusts phase of said modulator configuration to minimize power spectral density at and around the optical carrier frequency of the CSRZ format modulated optical signal.

20. The transmitter as set forth in claim 12, wherein the filtering bandwidth of said optical filter is approximately 60% of the data rate of the transmitter.

* * * * *